V. G. APPLE.
POWER TRANSMISSION AND SPEED CHANGING DEVICE.
APPLICATION FILED MAR. 13, 1913.
1,187,798.
Patented June 20, 1916.
2 SHEETS—SHEET 2.
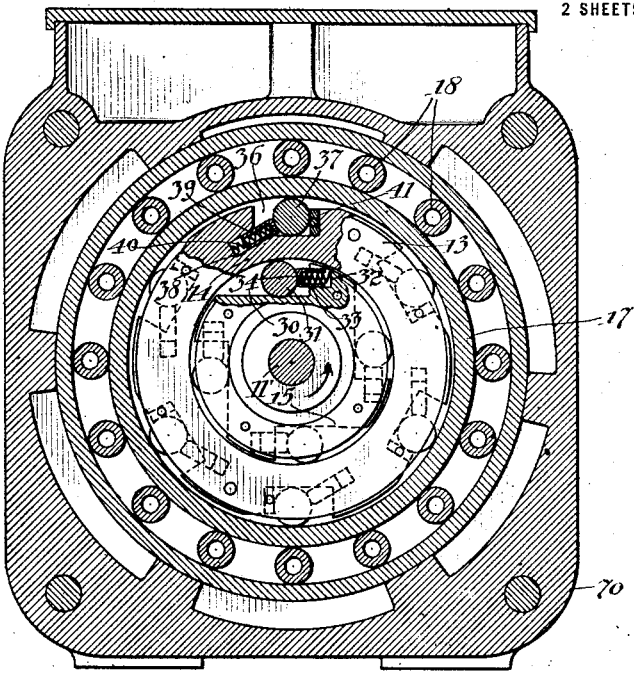
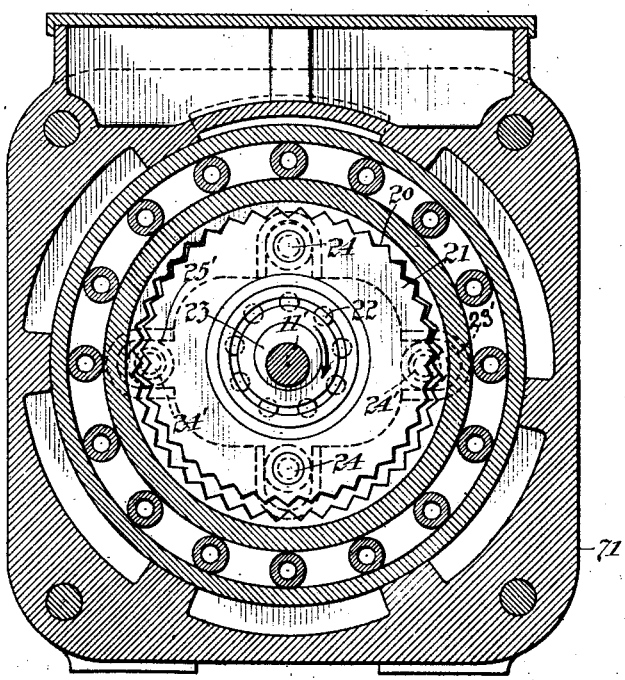
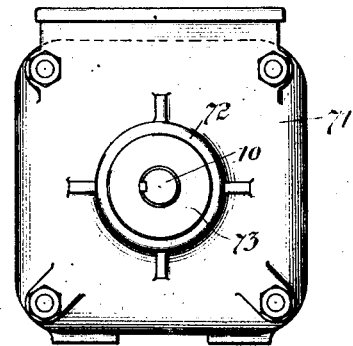

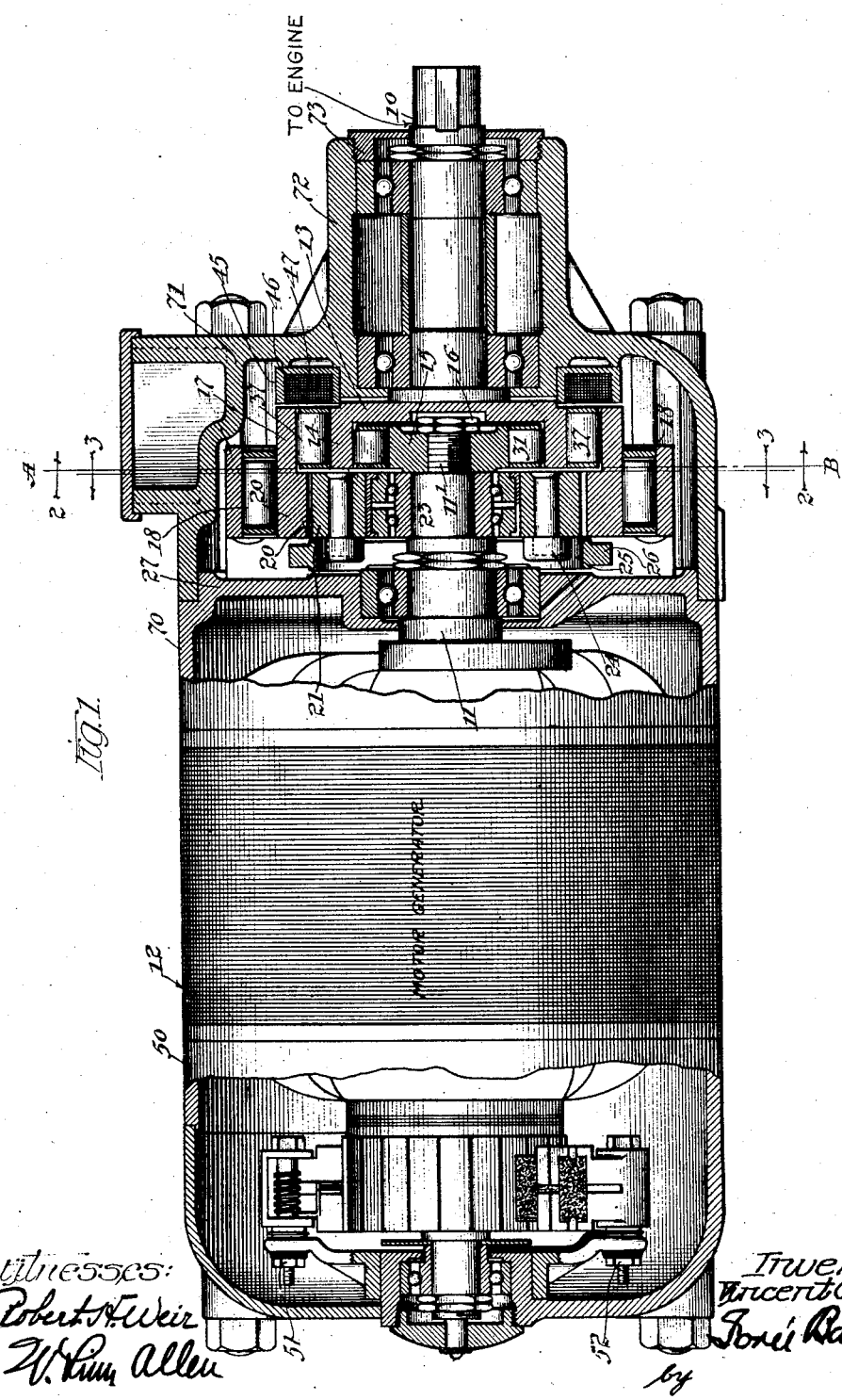

UNITED STATES PATENT OFFICE.

VINCENT G. APPLE, OF DAYTON, OHIO, ASSIGNOR TO APPLE ELECTRIC COMPANY, OF DAYTON, OHIO, A CORPORATION OF OHIO.

POWER-TRANSMISSION AND SPEED-CHANGING DEVICE.

1,187,798.  Specification of Letters Patent.  Patented June 20, 1916.

Application filed March 13, 1913. Serial No. 753,899.

*To all whom it may concern:*

Be it known that I, VINCENT G. APPLE, a citizen of the United States, residing at Dayton, in the county of Montgomery and State of Ohio, have invented certain new and useful Improvements in Power-Transmission and Speed - Changing Devices, of which the following is a specification.

My invention relates to improvements in power transmission and speed changing devices and more particularly to devices wherein either of two shafts may drive the other, but under different speed ratio accordingly as one or the other of the shafts is the driver.

In many environments,—as for example, in the provision of connecting devices for coupling together an engine and a dynamo so that the dynamo, acting as a motor, may slowly rotate the engine shaft to start the engine and so that the engine, when started, may rapidly rotate the dynamo shaft to run the dynamo as a generator—it is important that a speed reducing gearing be employed which is capable of great speed reduction through a minimum number of gear-parts, which operates silently, is compact, durable, efficient, and structurally adapted for effective coöperation with simple speed-responsive clutch means for throwing the reduction gearing into or out of operation.

My present invention provides such a reducing gear structure, and for complete disclosure of a practical embodiment thereof, I have shown the same in coöperative relation with clutch means of the specific form described and claimed in my Patent No. 1,039,685, granted October 1, 1912, in which said patent, for illustration of a practical embodiment of my said clutch-invention, I have shown and described, but not claimed, my present invention as one available form of reduction gearing for employment conjointly with the character of clutching mechanism forming the invention patented in said patent. It will, however, be understood by those skilled in the art that my present invention is not restricted to the employment of the particular character of clutch means which may be associated therewith, and that other clutch structures than that patented by my said patent may be employed in connection with my present invention.

In the drawings wherein I have illustrated, for purposes of clear disclosure, a specific embodiment of my invention, employing my invention as a means for effecting connection between an internal combustion engine shaft and the shaft of a dynamo electric machine, Figure 1 is a central vertical section through the gearing with parts of the dynamo in elevation; Fig. 2 is a transverse section taken on line A—B of Fig. 1, looking in the direction of the arrows 2—2; Fig. 3 is a section on the same line looking in the direction of the arrows 3—3; and Fig. 4 is an end view of the dynamo shown in reduced size.

In the drawings, 10 and 11 indicate two shafts of which I will term the engine, or secondary, shaft 10, and the dynamo, or primary, shaft 11.

A motor-generator 12 and internal combustion engine may often be employed to mutual advantage in arrangement whereby the motor shaft 11 may drive the engine shaft 10—as in starting a gas engine— or the engine shaft 10 may drive the generator shaft 11—as in generating electric current for utilization in ignition and the like.

While I do not restrict the application of my invention to the use illustratively shown, the drawings indicate a structure especially adapted for connection of an automobile lighting and starting dynamo electric-machine to the shaft of an automobile engine, and I will therefore describe such specific application in some detail.

In the particular construction shown the dynamo shaft 11 has its end shaped to form an eccentric 23, working, through a suitable ball bearing 22, within the central opening of a spur gear 21, which is of smaller diameter than, and has a different number of teeth from, the internal gear 20 with which the spur gear is constantly in mesh at some point, said internal gear being rotatable, and to this end it is mounted in roller bearings 18. The construction shown provides forty teeth on the internal gear 20 and thirty-nine teeth on spur gear 21.

The spur gear 21 may be universally moved, radially, in its plane by the eccentric but is maintained against rotation, and to this end it is provided on its inner face with projecting rollers engaging vertical slots 25 in a yoke member 26 which is arranged in proximity to a stationary casing wall 27, and which has also transverse slots 23′ engaging roller studs 24′ projecting from said fixed wall 27. Now it will be apparent that as the shaft 11 rotates, its eccentric will radially move or "vibrate" the spur gear 21, so that the teeth thereof, successively wedging radially into the tooth-valleys of the internal gear, will rotate the annular internal gear 20 slowly—in the present instance in the ratio of 1 to 40.

For effecting coöperation between either the outer, slow-moving gear member 20, or the shaft 11, and the coöperating shaft 10, I provide two clutch devices, alternatively operable, and these clutching instrumentalities may in some embodiments of my invention take widely varied forms, but in the character of apparatus herein shown it is advantageous that some form of clutching instrumentalities be employed which, by automatic response to the speed-ratios imposed on the rotating parts, will clutch the outer gear member to the shaft 10 when the shaft 11 acts as a driver, and will clutch the two shafts 10 and 11 directly together for rotation in unison when the shaft 11 acts as the driver.

One advantageous form of such speed-responsive clutching means is patented in my prior patent, and that form I herein show.

Specifically, shaft 10 carries an intermediate clutch element 13 having an annular overhanging ring 14 as a salient portion. An extremity 11′ of the dynamo shaft carries an inner clutch element 15, threaded thereon and retained by lock-nuts 16. Peripherally around the intermediate clutch member, and in the same transverse plane, lies an outer clutch element 17, connected with the outer gear element 20 for rotation therewith, and preferably made integral with said gear element 20, as shown, so that the bearings 18 position it in respect to the other clutch elements.

To provide for the engagement of the intermediate clutch elements with either of the inner elements 15 or the outer element 17 I provide rolling wedge clutch parts 31 and 37 respectively interposed between the rotatable elements and carried thereby. Thus the element 15 has peripheral tapering pockets 30 decreasing in size or depth in forward direction, that is, the direction of rotation, to receive rolling members 31 of appropriate size to contact with the smooth confronting surface of element 14 either to clutch the inner and intermediate members together, when in the narrow portion of the pocket, or to free said members for relative position, when in the wider portion of the pocket. Preferably, further, I provide at the deeper end of each pocket a recess 32 in which is slidably mounted a thimble 33 projected outwardly by spring 34, thereby to tend, normally, to hold the rollers or rolling members in the shallower portion of their pockets. Similarly, I provide in the periphery of the intermediate clutch element 14, pockets 36, tapering forwardly, in the same direction as pockets 30, and containing the rolling members 37 movable to wedge against or to release the smooth inner surface of the exterior clutch member 17. Preferably, a recess 38 is made at the front or shallower ends of the pockets to receive a thimble 39 pressed forwardly by springs 40 so as normally to hold the rolling members at the deeper rear ends of the pockets.

It will be obvious that, in the absence of the spring structures 34 and 40, affecting the rolling members 31 and 37 respectively, when shaft 11 is rotated as a driver, with shaft 10 standing still, the rolling members 31 of the inner set would roll to the deeper end of their pockets, while the rolling members 37 of the outer set would be rolled, by the slowly rotating outer clutch element 17, to the shallow ends of their pockets, thereby to clutch the shaft 10 to the slowly rotating clutch element 17 so that the shaft 11 drives said shaft 10 through the reduction gear. The springs 34 and 40 acting oppositely on the inner and outer sets of rolling members tend to prevent the said movement of both said sets of rolling members.

When the shaft 10 is turned, as by the driver, shaft 11 standing still, inner rolling members 31 tend to roll to the shallower portion of their pockets to exert a clutch action and rolling members 37 tend to roll to the deeper end of their pockets to effect a releasing action. The springs aid these movements. Therefore, it will be seen, that the double clutch is capable of automatically effecting connection from shaft 10 to shaft 11 by the direct clutch action and of effecting connection from shaft 11 to shaft 10 through the reduction gearing in response to the variation of speed of the parts, the connections first mentioned being assisted by the spring for the inner set of rollers and the connections last mentioned being resisted by the spring for the outer set of rollers.

The action of springs 40 may be made so strong that they will normally prevent clutch engagement taking place between the intermediate and outer clutch members by the effect of centrifugal action. So, in order that the clutch preventing or disabling action of the abnormally strong springs 40 may be overcome and positive clutch action insured at will, I may form the rolling members 37 of magnetically susceptible material and associate with them an electro-magnet in such fashion that through the effect of the electro-magnet the magnetically susceptible rollers will respond to movement of the outer clutch member 17 to overcome the spring resistance and more promptly effect its functional wedge action between the elements 17 and 13. My invention, however, is not dependent upon the springs nor the magnetic action of the rolling members and therefore since these features are not of present interest I will not describe them in further detail.

When the speed of the shaft 10, which is designed to be connected to the internal combustion engine, exceeds that of the motor shaft 11, it is desirable that these two shafts should be connected together so that they will move substantially as one and to this end the parts 14 and 15 will be directly clutched together by the effect of the rolling speed responsive clutch members 31, and when this engagement is effected the dynamo can be driven as a generator directly by the engine to generate current and to recharge the battery from which the current may be supplied to run the dynamo as a motor during the starting of the engine. In the initial operation of the device, when the dynamo is used as a motor to start the engine and is being energized by the battery, and when the motor shaft 11 is turning at a higher speed than the engine shaft 10, then the rolling clutch members 37 will engage the parts 17 and 14, the latter being directly carried by the engine shaft 10, and thereby the speed reduction gearing will be interposed between the engine shaft 10 and the dynamo shaft 11 and the direct connection between these shafts will be disconnected, in the manner heretofore described.

While my invention may be variously embodied, the mechanical construction shown is one which I find advantageous in an automobile-starting and electrifying system, and in such arrangements I embody a clutch and reduction gearing in the structure of the dynamo casing 70 which affords suitable bearing for the shaft 11 and such casing 70 has an extension 71 forming a closed housing for the reduction gearing and clutch members, said end of the housing 71 having a hub extension 72 receiving two roller bearings for adequate guiding support of the shaft 10. The extremity of the hub 72 may be substantially closed by a screw cap 73, so that the entire mechanism is housed within the dynamo casing and completely protected.

Both the flat, thin construction of the reduction gearing, which, in effect lies wholly to the left of line A—B of Fig. 1, and the narrowness of the specific form of clutch, which lies wholly to the right of line A—B, contribute to the compact, small organization readily inclosable within the dynamo casing, and it will be noted that the character of reduction gearing, and its construction, gives to the device a minimum number of wearing parts, coördinated for silent operation, and effecting a great speed reduction for high torque at low speed.

Having described my invention, what I claim is:

1. The combination of a driving shaft; an eccentric, rotated thereby; a driven shaft, coaxially arranged with the driving shaft; an internal gear wheel; a unidirectionally operating clutch means to connect said gear wheel with the driven shaft; a spur gear wheel mounted on said eccentric and having a different number of teeth from said internal gear wheel, said wheels being in mesh relation with each other; and means to prevent the rotation of said spur gear wheel.

2. The combination of a driving member, an eccentric, rotated thereby; a driven member; an internal gear wheel; means, including a uni-directionally operating clutch, connecting said gear wheel with the driven member; a spur gear wheel, mounted on said eccentric and having a different number of teeth from said internal gear wheel, said wheels being in mesh relation with each other; and means, for preventing the rotation of said spur gear wheel.

3. The combination of a driving member; an eccentric, rotated thereby; a driven member; an internal gear wheel; means, including a speed responsive clutch, connecting said gear wheel with the driven member; a spur gear wheel, mounted on said eccentric and having a different number of teeth from said internal gear wheel, said gears being in mesh relation with each other; and means, for preventing the rotation of said spur gear wheel.

4. The combination of a driving member; a driven member; a reduction gearing, comprising an eccentric rotated by the driving member, a spur gear wheel carried by said eccentric, an internal gear wheel meshing with said spur gear and having a different number of teeth therefrom; means, for preventing the rotation of one of said gears; and means, including a speed responsive clutch for connecting the other gear with the driven member.

5. The combination of a driving member; a driven member; a reduction gearing, comprising an eccentric rotated by the driving member, a spur gear wheel carried by said eccentric, an internal gear wheel meshing with said spur gear and having a different number of teeth therefrom; means, for preventing the rotation of one of said gears; and means, including a unidirectionally operating clutch for connecting the other gear with the driven member.

6. A primary shaft; an eccentric, rotatable thereby; a secondary shaft; an internal gear wheel; a spur gear wheel bodily movable by said eccentric, meshing with the internal gear and having a different number of teeth therefrom, means to prevent rotation of the spur gear wheel; clutch means between the internal gear and secondary shaft; and clutch means adapted directly to connect the primary shaft and secondary shaft.

7. A primary rotary member; an eccentric, rotatable thereby; a secondary rotary member; a reduction gearing, comprising a spur gear wheel carried by said eccentric, an internal gear wheel meshing with said spur gear wheel and having a different number of teeth therefrom; means for preventing the rotation of one of said gears; clutch means, between the other gear and the secondary rotary member; and clutch means adapted to directly connect the primary and secondary rotary members.

8. A primary shaft; an eccentric, rotatable thereby; a secondary shaft; a reduction gearing, comprising a spur gear wheel carried by said eccentric, an internal gear wheel meshing with the said spur gear wheel and having a different number of teeth therefrom; means, for preventing rotation of one of said gear wheels; a uni-directionally operating clutch, between the other gear wheel and the secondary shaft, and a second uni-directionally operated clutch, for directly connecting the primary shaft and secondary shaft.

9. A primary shaft; an eccentric rotatable thereby; a secondary shaft; a reduction gearing, comprising a spur gear wheel carried by said eccentric, an internal gear wheel meshing with the said spur gear wheel and having a different number of teeth therefrom; means, for preventing rotation of one of said gear wheels; a clutch responsive to relative movement of its parts, interposed between one of said gears and the secondary shaft and a second clutch responsive to relative movement of its parts adapted to directly connect the primary and secondary shafts.

10. The combination of a primary shaft; a secondary shaft; a reduction gear, comprising, an eccentric, rotated by one of the shafts, an internal gear wheel, associated for rotation with the other shaft, a spur gear wheel, bodily movable by said eccentric and having a different number of teeth from the internal gear wheel, said wheels being in mesh relation with each other, means to prevent rotation of said spur gear wheel; and clutching means, for directly connecting the two shafts.

11. The combination of a primary rotary member; a secondary rotary member; a reduction gearing, comprising an eccentric rotated by one of the said members, an internal gear wheel associated for rotation with the other member; a spur gear wheel bodily movable by said eccentric and having a different number of teeth from said internal gear wheel, said wheels being in mesh relation with each other, means to prevent rotation of one of the gear wheels; a uni-directionally operating clutch between the other gear and one of the shafts and clutching means responsive to relative movement of its parts for directly connecting the two shafts.

12. The combination of a driving member, a driven member, means comprising an internal gear wheel on the driven member and a floating spur-gear wheel driven from the driving member and meshing with the internal gear wheel for driving the driven member from the driving member at a reduced speed, means for preventing the rotation of the spur gear wheel and means, when the speed of the driven member attains the speed of the driving member, for coupling the two members together.

13. The combination of a driving member; a driven member; means, comprising an internal gear wheel on the driven member and a floating spur gear wheel driven from the driving member and meshing with the internal gear wheel for transmitting power between the two members at a reduced speed; means for preventing rotation of the spur gear wheel, and means responsive to relative movement of its parts for connecting the two shafts together.

14. The combination of a primary rotary member; a secondary rotary member; a reduction gearing, comprising an internal gear wheel; a floating spur gear wheel driven from the primary rotary member and meshing with the internal gear wheel; means, including a uni-directionally operating clutch for connecting one of said gears with the secondary rotary member; means, for preventing rotation of the other gear; and means, when the speed of the secondary rotary member attains the speed of the primary rotary member for coupling the two members directly together.

15. The combination of a primary rotatable member; a secondary rotatable member; means comprising an internal gear wheel, and a floating spur gear wheel driven from one of the members and meshing with the internal gear wheel for transmitting power between the two members at a reduced speed; means for preventing the rotation of one of said gear wheels and means responsive to relative movement of its parts for directly connecting the two members together.

16. The combination of a driving shaft, a driven shaft, means comprising an internal gear wheel on the driven shaft and a floating spur-gear wheel driven from the driving shaft and meshing with the internal gear wheel for driving the driven shaft from the driving shaft at a reduced speed, and means, when the speed of the driven shaft attains the speed of the driving shaft for coupling the two shafts so they will rotate together at uniform speed.

In testimony whereof I hereunto set my hand in the presence of two witnesses.

VINCENT G. APPLE.

In the presence of—
 E. V. MARTIN,
 M. O'CONNOR.